US006788066B2

(12) United States Patent
Wisler et al.

(10) Patent No.: US 6,788,066 B2
(45) Date of Patent: Sep. 7, 2004

(54) METHOD AND APPARATUS FOR MEASURING RESISTIVITY AND DIELECTRIC IN A WELL CORE IN A MEASUREMENT WHILE DRILLING TOOL

(75) Inventors: Macmillan M. Wisler, Kingwood, TX (US); Larry W. Thompson, Willis, TX (US); LucVan Puymbroeck, Kingwood, TX (US); Holger Stibbe, Humble, TX (US); Hallvard S. Hatloy, Nienhagen (DE)

(73) Assignee: Baker Hughes Incorporated, Houston, TX (US)

( * ) Notice: Subject to any disclaimer, the term of this patent is extended or adjusted under 35 U.S.C. 154(b) by 29 days.

(21) Appl. No.: 09/760,679

(22) Filed: Jan. 16, 2001

(65) Prior Publication Data

US 2001/0050559 A1 Dec. 13, 2001

Related U.S. Application Data

(60) Provisional application No. 60/177,027, filed on Jan. 19, 2000.

(51) Int. Cl.[7] ............................ G01V 3/08; E21B 49/02
(52) U.S. Cl. ..................................... 324/376; 73/152.07
(58) Field of Search ................................ 324/376–377, 324/338, 339, 639–641, 348, 351, 369; 73/152.07, 152.09, 152.11, 864.44

(56) References Cited

U.S. PATENT DOCUMENTS

| 4,536,713 A | 8/1985 | Davis et al. ................. 324/324 |
| 4,873,488 A | 10/1989 | Barber et al. ................ 324/339 |
| 4,996,489 A | 2/1991 | Sinclair ....................... 324/639 |
| 5,209,104 A | * 5/1993 | Collins et al. .................. 73/38 |
| 5,644,091 A | 7/1997 | Jacq et al. ............... 73/864.44 |
| 5,670,717 A | 9/1997 | Lamine et al. ........... 73/152.11 |
| 5,811,973 A | 9/1998 | Meyer, Jr. ................... 324/338 |
| 5,939,885 A | 8/1999 | McClure et al. ............ 324/338 |
| 6,003,620 A | 12/1999 | Sharma et al. ................ 175/50 |

FOREIGN PATENT DOCUMENTS

US          0 646 810 A2    4/1995

* cited by examiner

Primary Examiner—N. Le
Assistant Examiner—Reena Aurora
(74) Attorney, Agent, or Firm—Madan, Mossman & Sriram, P.C.

(57) ABSTRACT

A highly accurate, fully compensated, high spatial resolution, wave propagation system for measuring dielectric constant and resistivity of fluids or solids in a cylindrical enclosure and method for measuring well core characteristics in-situ or in a laboratory. One embodiment of the invention relies on waves propagated from transmitters above and below two spaced receivers which transmit and receive electromagnetic waves via slots on the inner periphery of a cylinder structure. The data is then processed with a CPU either down hole for later retrieval or on the surface for real-time monitoring.

37 Claims, 5 Drawing Sheets

METHOD AND APPARATUS FOR MEASURING RESISTIVITY AND DIELECTRIC IN A WELL CORE IN A MEASUREMENT WHILE DRILLING TOOL

CROSS-REFERENCES TO RELATED APPLICATIONS

This application claims priority from U.S. Provisional patent application Ser. No. 60/177,027 filed on Jan. 19, 2000.

BACKGROUND OF THE INVENTION

1. Field of the Invention

The present invention relates generally to measurement-while-drilling tools and specifically to resistivity and dielectric constant measuring tools.

2. Background and Description of the Prior Art

Drilling oil wells is an extremely expensive undertaking. The more confidence that a particular formation will be productive the easier it is for a drilling company to take the financial risks associated with the drilling operation. Technology has progressed to allow acquisition of informative data to determine the viability of a well. Two current methods of formation evaluation are the down hole measurement while drilling (MWD) method and core sample method. In the MWD method, down hole instrumentation measures specified parameters of the formation surrounding the drill stem. In the core sample method, a special drill bit is used that allows the retrieval of a section of formation for evaluation by surface measuring devices. In some cases the instrumentation for MWD is used down hole while also drilling a core sample to measure the properties of the surrounding formation for later comparison to core sample data recorded on the surface.

A technique used for evaluating formations surrounding an earth borehole is to measure the resistivity and dielectric constant of the formation. Porous formations with high resistivity and dielectric constant generally indicate the presence of hydrocarbons while porous formations with low resistivity and dielectric constant are normally water saturated and contain no hydrocarbons.

Typically, tools used to measure these formation characteristics during drilling use a wave propagation tool to measure phase delay and attenuation of electromagnetic waves propagating in the formation over a predefined interval. Such devices are described in detail in U.S. Pat. Nos. 3,551,797 and 4,968,940. All conventional devices for use during drilling use antennas on the outside of a drill collar to transmit or receive the signal. The general direction of advancement is always toward higher data accuracy with higher reliability.

The methods for evaluation of core samples for geophysical parameters which are of interest to the person skilled in the art in the study of oil wells being drilled utilize, for example, the natural radioactivity of the core sample, the absorption of a known radiation emitted by a known source arranged in proximity to the core sample, and the value of the liquid saturation of the core sample (which value is measured by induction).

To date, this type of parameter has been measured and/or detected by first retrieving a core sample and then arranging the core sample which has been withdrawn from the well substantially horizontally on the ground and by moving a carriage equipped with the measuring instrument or instruments manually along the core sample.

Parameters of the abovementioned type can be influenced by the environment of the core sample at the time of measurement, or else similar parameters originating from the environment may be added to the corresponding parameters of the core sample during the measurement taken therefrom. Thus, when the core sample is arranged horizontally, since one of its sides is closer to the ground than the other, this difference in distance may affect the result of the measurement, or else the ground may influence the instruments because of its proximity, this being increasingly so since this proximity is asymmetrical relative to the mass of the core sample as a whole. Overall, lack of accessibility to the core sample makes it difficult to optimize the measurement. The present invention combines the advantages of core sampling with the advantages of MWD to provide an apparatus and method to determine the characteristics of a core sample while the sample is in its original environment and while in its original orientation relative to the surrounding formation.

SUMMARY OF THE INVENTION

It is a general objective of the present invention to provide an improved measurement-while-drilling (MWD) tool and method for obtaining highly accurate data regarding resistivity and dielectric constant parameters of solids, liquids or a combination thereof, whether flowing or stationary, while core drilling a well or in a laboratory. This objective can be met with an in-situ core sample measuring embodiment wherein a core sample is measured within the core sample cavity of a drill stem by situating a receiving antenna, a plurality of transmitters and a plurality of receivers in a core drill stem such that the electromagnetic waves propagate through the core sample within the core sample cavity rather than the formation surrounding the drill stem.

This objective may also be met in a laboratory environment with a cylindrical cavity containing the sample to be measured. The cylindrical cavity being equipped with electromagnet wave propagation instrumentation as mentioned in the above drilling system. Other features and advantages will become clear in the following detailed description.

DETAILED DESCRIPTION OF THE INVENTION

Figure 1:
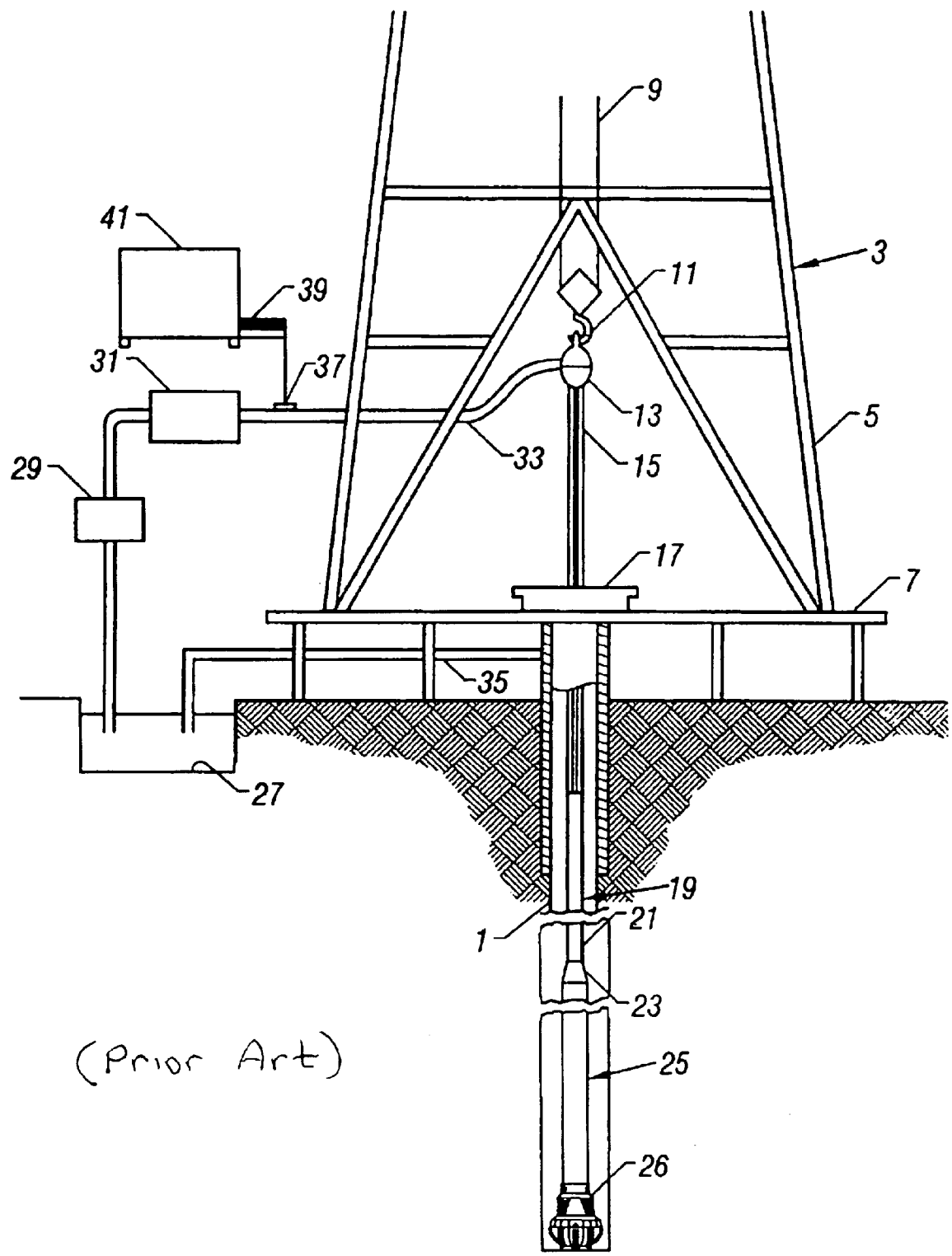
FIG. 1 depicts a drilling system.

The present invention is a highly accurate, fully compensated, high spatial resolution, wave propagation system for measuring dielectric constant and resistivity of fluids or solids in a cylindrical enclosure. The system can be used for measuring well core characteristics in-situ or in a laboratory, and can also be used for measuring fluids, solids or combination thereof either during flow or stationary inside the cylindrical cavity. Systematic unknown variables which affect measurement have led to inaccuracies in other resistivity and dielectric constant measurement systems.

One embodiment of the present invention relies on waves propagated from transmitters spaced symmetrically above and below two spaced receivers which communicate electromagnetically via slots on the inner periphery of a cylindrical structure.

Referencing FIG. 1, an overall simultaneous drilling and logging system that incorporates an electromagnetic wave propagation resistivity and dielectric constant measurement system according to this invention will now be described in greater detail. A well 1 is being drilled into the earth under control of surface equipment including a rotary drilling rig 3. In accordance with a conventional arrangement, rig 3 includes a derrick 5, derrick floor 7, draw works 9, hook 11, kelly joint 15, rotary table 17, and drill string 19 that includes drill pipe 21 secured to the lower end of kelly joint 15 and to the upper end of a section of drill collars including an upper drill collar 23, an intermediate drill collar (not separately shown), and a lower drill collar measurement tubular 25 immediately below the intermediate sub. A drill bit 26 is carried by the lower end of measurement tubular 25. During well drilling operations the drill bit will be a conventional bit when the main purpose is to reach a desired depth. The conventional drill bit will be replaced by a coring bit when core samples are desired. The purpose of the core bit is to retain within the drill string a sample of the borehole called a core sample. The core sample is typically brought to the surface for testing and analysis to determine the characteristics of the formation at the depth from which the core sample was taken. It will be explained later in this description the relationship to current drilling measurements systems, core measurement systems and the present invention.

Drilling fluid, or mud as it is commonly called, is circulated from a mud pit 27 through a mud pump 29, past a desurger 31, through a mud supply line 33, and into swivel 13. The drilling mud flows down through the kelly joint 15 and an axial central bore in the drill string, and through jets (not shown) in the lower face of the drill bit. The drilling mud flows back up through the annular space between the outer surface of the drill string and the inner surface of the borehole to be circulated to the surface where it is returned to the mud pit through a mud return line 35. A shaker screen (not shown) separates formation cuttings from the drilling mud before the mud is returned to the mud pit.

The overall system in FIG. 1 uses mud pulse telemetry techniques to communicate data from down hole to the surface while drilling operations take place. To receive data at the surface, there is a transducer 37 in mud supply line 33. This transducer generates electrical signals in response to drilling mud pressure variations, and the electrical signals are transmitted by a surface conductor 39 to a surface electronic data processing system 41.

Mud pulse telemetry techniques provide for communicating data to the surface about numerous down hole conditions sensed by well logging transducers or measurement systems that ordinarily are located on and within the drill collar nearest the drill bit. The mud pulses that define the data are produced by equipment within the intermediate sub. Such equipment typically comprises a pressure pulse generator operating under control of electronics contained within an instrument housing to allow drilling mud to vent through an orifice extending through the logging collar wall. Each time the pressure pulse generator causes such venting, a negative pressure pulse is transmitted to be received by surface transducer 37. An alternative conventional arrangement generates and transmits positive pressure pulses.

The circulating drilling mud provides a source of energy for a turbine-driven generator sub-assembly located in the intermediate sub, and the turbine-driven generator sub-assembly generates electrical power for the pressure pulse generator and for various circuits including forming part of the preferred embodiment of this invention. As an alternative or supplemental source of electrical power, batteries may be provided, particularly as a backup for the turbine-powered generator.

Figure 2A:
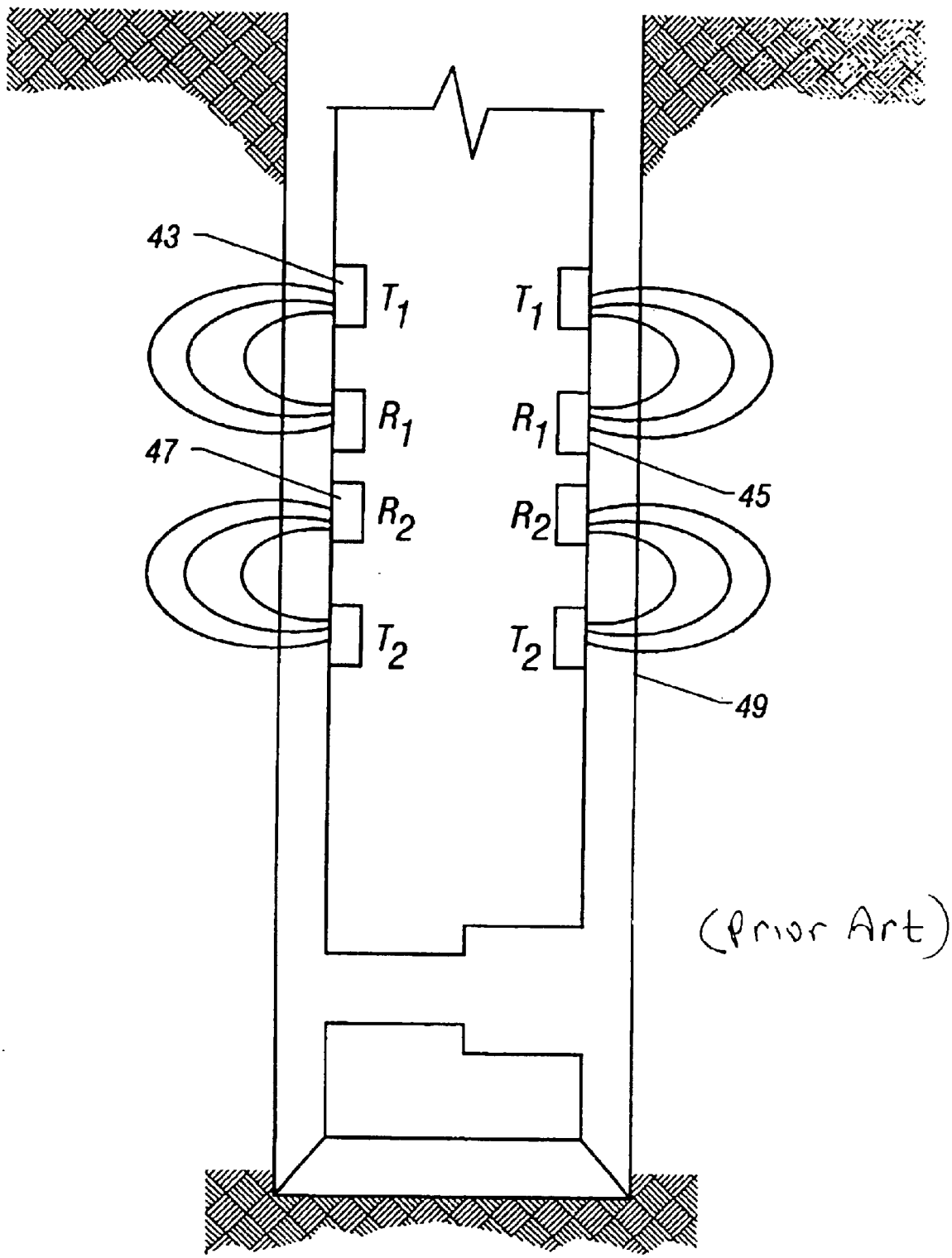
FIG. 2A prior art shows a conventional measurement system simplified diagram.
Figure 2B:
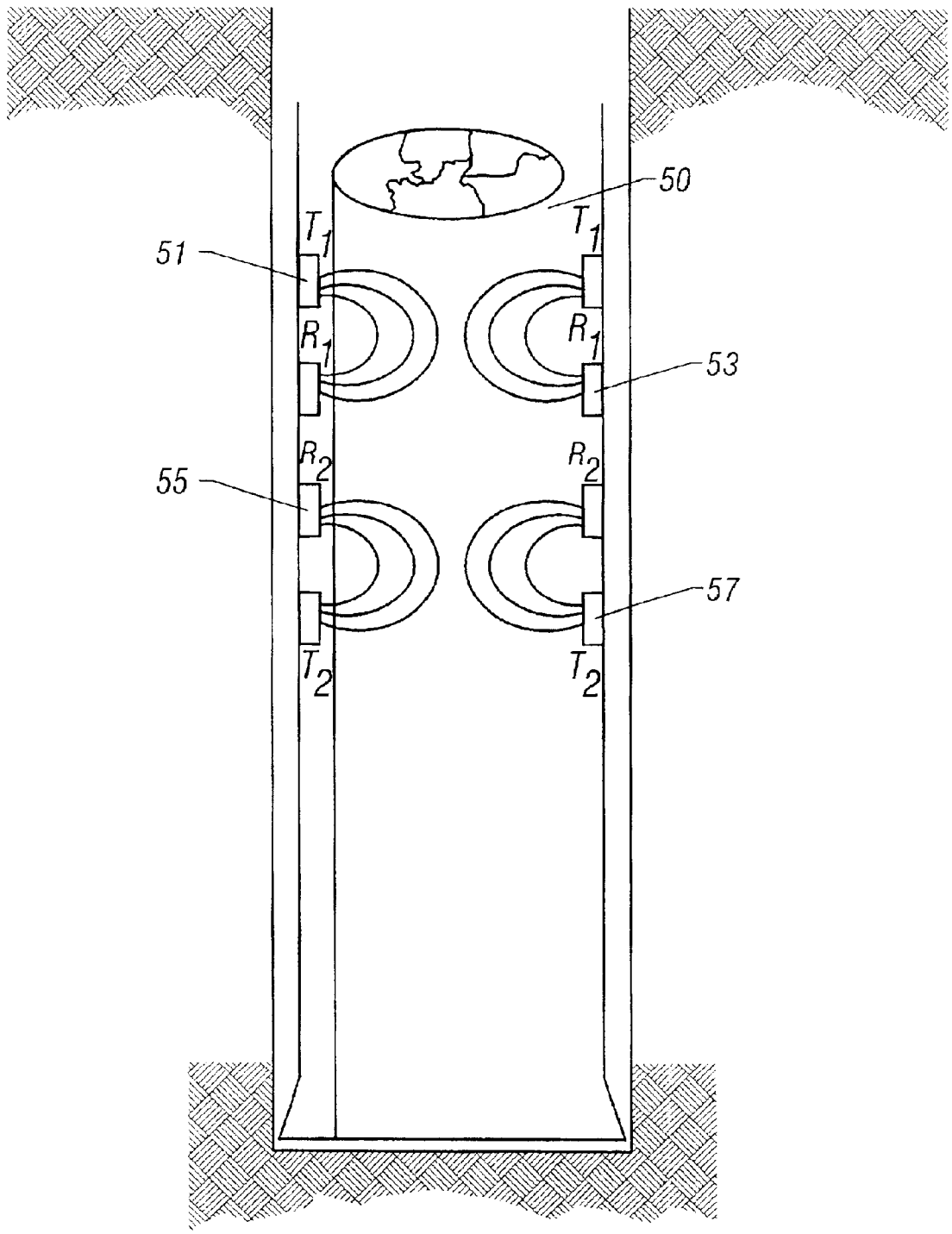
FIG. 2B is a simplified diagram of the present invention.

In general, previous MWD systems measure the formation surrounding the drill stem as shown in FIG. 2A. The measurement of surrounding formation parameters is accomplished by having electromagnetic waves transmitted alternately from transmitters 43 and 49. The waves pass through the surrounding formation and are received by receivers 45 and 47. Contrast this conventional measurement with the simplified diagram of the measuring system of the present invention shown in FIG. 2B. For an MWD embodiment, the present invention can be utilized down hole conveyed on a tool such as a drill string or a coiled tubing. Transmitters 51 and 57 pass electromagnetic fields through a core sample 50 and the fields are picked up by receivers 53 and 55. Such a symmetric arrangement of transmitters about the receivers makes it possible to fully compensate for any linear changes to the measurement system. U.S. Pat. No. 5,811,973 issued to Meyer, Jr. and having the same assignee as the present invention discloses a propagation resistivity measurement-while-drilling system used to determine the resistivity (or conductivity) of the connate formation fluid, the dielectric constant of the dry rock matrix, and the water filled porosity of the formation. One or more transmitter-receiver pairs are utilized with the transmitter component of the transmitter-receiver pairs operating at a plurality of frequencies. Water filled porosity measurements can be combined with an independent measurement which responds to the total fluid porosity of the formation to obtain a measure of formation hydrocarbon saturation in fresh or saline connate water environments. The contents of U.S. Pat. No. 5,811,973 are fully incorporated here by reference.

Figures 3A, 3C:
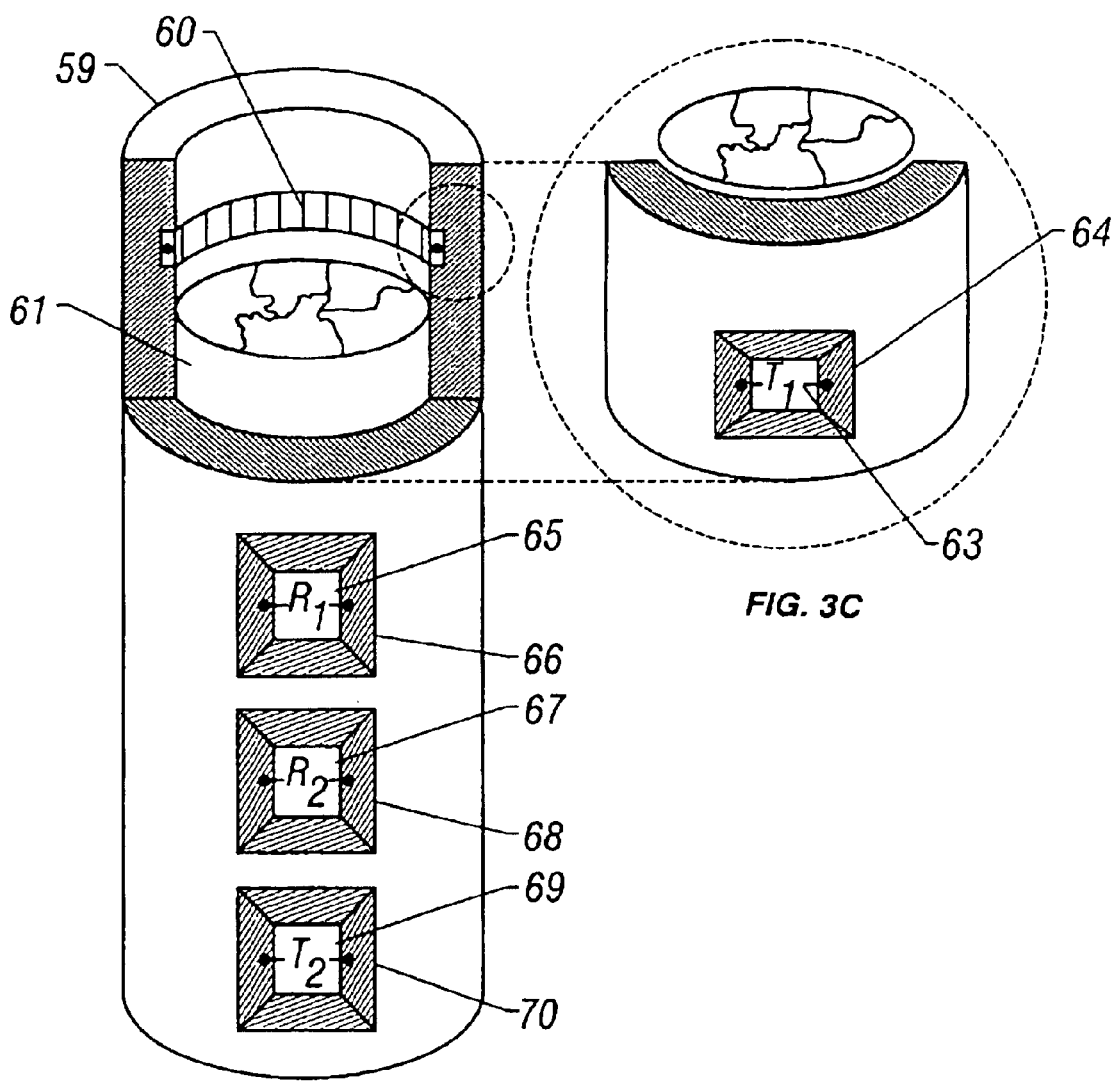
FIG. 3A is a detailed view of the data acquisition portion of the present invention with a cutaway showing a sample contained therein.
FIG. 3C shows the cutaway of FIG. 3A.

Refer now to FIG. 3A which shows the data acquisition portion of the preferred embodiment of the present invention in detail. A cylindrical enclosure 59, which may be a modified core barrel, contains a liquid, solid, gas or combination sample 61, either flowing or stationary. The sample in the case of the MWD embodiment is a core sample.

Transmitter T1 63 generates an electromagnetic wave to be passed through sample 61 and received by receivers R1 65 and R2 68. The wave is propagated and received via antennas 64 and 66 respectively. In an alternating fashion, transmitter T2 69 generates an electromagnetic wave to be passed through sample 61 and received by receivers R1 65 and R2 68. The waves from T1 and T2 are propagated and received via antennas 70 and 68 respectively. The transmitters are fixed within the cylindrical enclosure 59 about the inner surface. A plurality of apertures 60 (shown for T1 only) are provided for each transmitting antenna.

Figure 3B:
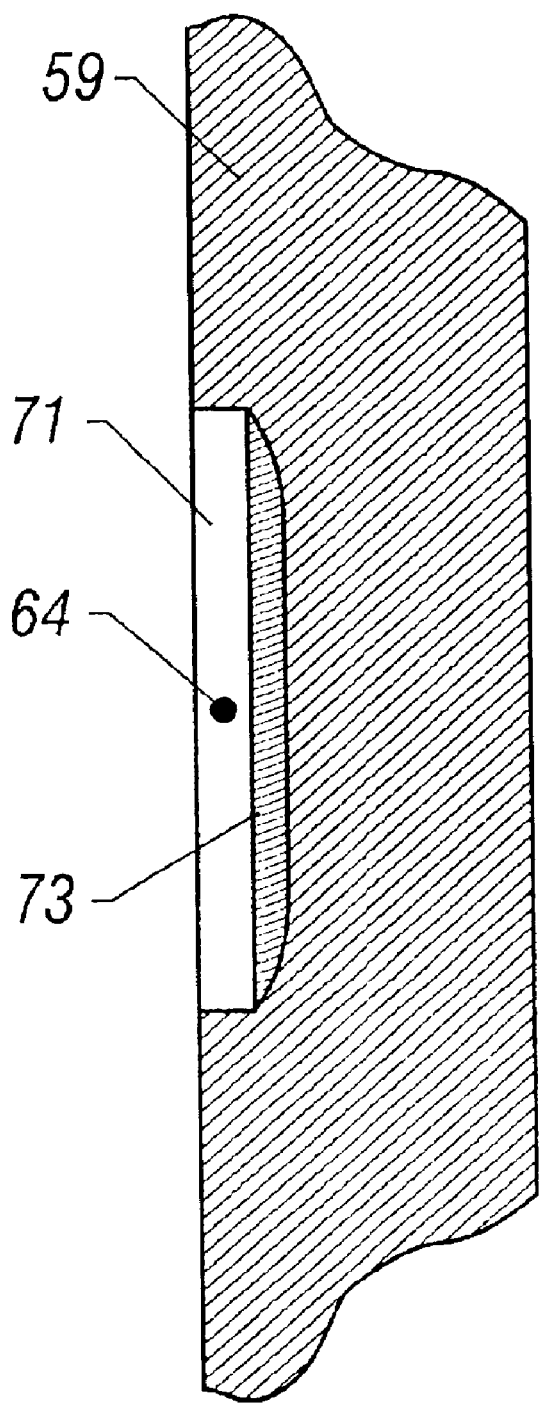
FIG. 3B is an enlarged cross sectional view of an aperture in the present invention.

In FIGS. 3B–C, an enlarged aperture cross section is shown which is substantially similar to all other apertures in the preferred embodiment. An electromagnetic shielding material 73 such as a soft ferrite is positioned within each aperture for protecting the cylindrical enclosure from the electromagnetic radiation. Toward the inner surface, antenna wire 64 is fixed in said apertures with and a potting material 71 which also provides protection for said antenna wire. In a preferred embodiment the potting material is an epoxy resin.

In an alternate embodiment of the invention (not shown) the transmitter antenna is set in a circumferential recess on the inside of the cylinder. This embodiment is structurally weaker than the slotted design of FIGS. 3A–3B.

Data recorded by the receivers can be either transmitted in real time to the surface or alternately can be recorded with recording instrumentation down hole (not shown) for later retrieval. For the real time data transmission embodiment, signals from the receivers are transmitted to the surface by a transmission path, transferred to a central processing unit (CPU) for processing. The processed data comprising measures of the parameters of interest, such as an amplitude resistivity or a phase resistivity, are correlated with depths from a drill collar depth indicator (not shown), and an output to a recorder which displays the computed parameters of interest as a function of depth at which the input measurements were made. An alternate embodiment comprises a processor unit (not shown) mounted within the drill collar 23 to perform data processing down hole. In order to most effectively utilize memory capacity, it is often desirable to process measured data down hole and store processed results rather than the more voluminous measured data.

It should be understood that the invention is in no way limited to the described embodiments, and that many changes may be made to these embodiments without departing from the scope of the present invention. Other embodiments would be obvious to those versed in the arts to which the invention pertains.

We claim:

1. An apparatus for measuring a parameter of interest of a material in a subterranean formation, the apparatus comprising:
   (a) a cylindrical enclosure for enclosing the material;
   (b) at least one transmitter having an antenna on the inside of the cylindrical enclosure for propagating electromagnetic radiation in the material at at least two frequencies;
   (c) at least one receiver having an antenna on the inside of the cylindrical enclosure axially displaced from the at least one transmitter for measuring electromagnetic radiation in the material at each of the at least two frequencies, the measurements indicative of the parameter of interest;
   (d) a core bit operatively coupled to the cylindrical enclosure for separating the material from the subterranean formation; and
   (e) a drilling tubular for conveying the cylindrical enclosure into a borehole in the subterranean formation wherein the drilling tubular is selected from the group consisting of (A) a drill string and (B) a coiled tubing.

2. The apparatus of claim 1 further comprising a processor for processing data measured by the receivers wherein the processed data comprises measures of the parameters of interest.

3. The apparatus of claim 1, wherein the parameter of interest is selected from the group consisting of (i) resistivity and (ii) dielectric constant of the material.

4. The apparatus of claim 1, wherein the material is at least one of a (i) liquid, (ii) solid, and, (iii) a gas.

5. The apparatus of claim 4, wherein the material is flowing.

6. The apparatus of claim 4, wherein the material is stationary.

7. The apparatus of claim 1, wherein the at least one transmitter comprises at least two transmitters, the at least one receiver comprises at least two receivers, and wherein the at least two transmitters are symmetrically arranged about the at least two receivers.

8. The apparatus of claim 1, wherein the at least one transmitter antenna is set in a circumferential recess on the inside of the cylindrical enclosure.

9. The apparatus of claim 8 further comprising a ferrite material positioned in the recess for shielding the cylindrical enclosure from electromagnetic radiation.

10. The apparatus of claim 8 further comprising an epoxy potting material for fixing the at least one transmitter antenna in the recess and protecting the antenna from damage.

11. The apparatus of claim 1, wherein each said antenna is set in a plurality of apertures on the inside of the cylindrical enclosure.

12. The apparatus of claim 11 further comprising a ferrite material positioned in the apertures for electromagnetic shielding of the cylindrical enclosure.

13. The apparatus of claim 11 further comprising an epoxy potting material for fixing the antenna in the apertures and protecting the antenna from damage.

14. A method for determining a parameter of interest of a material comprising:
   (a) operatively coupling a core bit to a cylindrical enclosure;
   (b) conveying the cylindrical enclosure into a borehole in a subterranean formation on a drilling tubular selected from the group consisting of (A) a drill string and (B) a coiled tubing;
   (c) operating the core bit for separating the material from the subterranean formation;
   (d) enclosing the material in the cylindrical enclosure;
   (e) inducing electromagnetic radiation in the material using at least one transmitter antenna on the inside of the cylindrical enclosure transmitting at least two frequencies; and
   (f) measuring with at least one receiver antenna axially disposed from the at least one transmitter the induced electromagnetic radiation in the material at each of the frequencies, the measurements indicative of the parameter of interest.

15. The method of claim 14 further comprising using a processor for processing the data to determine measures of the parameters of interest.

16. The method of claim 15, wherein the processor is at a location selected from the group consisting of (i) down hole on a drill string and (ii) on the surface for real time monitoring.

17. The method of claim 14, wherein the parameter of interest is selected from the group consisting of (i) resistivity and (ii) dielectric constant of the material.

18. The method of claim 14, wherein the material is selected from the group consisting of (i) a liquid, (ii) a solid, and (iii) a gas.

19. The method of claim 18, wherein the material is flowing.

20. The method of claim 18, wherein the material is stationary.

21. The method of claim 14, wherein the at least one transmitter comprises at least two transmitters, the at least one receiver comprises at least two receivers, and wherein the at least two transmitters are symmetrically arranged about the at least two receivers.

22. The method of claim 14, wherein the location of the at least one transmitter antenna and the at least one receiver antenna is selected from the group consisting of (i) a recess in the enclosure and (ii) a plurality of apertures in the enclosure.

23. The method of claim 22 further comprising shielding the cylindrical enclosure from electromagnetic radiation with a ferrite material.

24. The method of claim 22 further comprising fixing the at least one transmitter antenna and the at least one receiver antenna in place with an epoxy potting material.

25. An apparatus for measuring a parameter of interest of a material in a subterranean formation, the apparatus comprising:
(a) a cylindrical enclosure for enclosing the material;
(b) at least two transmitters each having an antenna on the inside of the cylindrical enclosure for propagating electromagnetic radiation in the material at least one frequency;
(c) at least two receivers each having an antenna on the inside of the cylindrical enclosure for measuring electromagnetic radiation in the material at the at least one frequency, wherein the at least two transmitters are symmetrically arranged about the at least two receivers, the measurements indicative of the parameter of interest;
(d) a core bit operatively coupled to the cylindrical enclosure for separating the material from the subterranean formation; and
(e) a drilling tubular for conveying the cylindrical enclosure into a borehole in the subterranean formation.

26. The apparatus of claim 25 further comprising a processor for processing data measured by the receivers wherein the processed data comprises measures of the parameters of interest.

27. The apparatus of claim 25, wherein the parameter of interest is selected from the group consisting of (i) resistivity and (ii) dielectric constant of the material.

28. The apparatus of claim 25, wherein the drilling tubular is selected from the group consisting of (A) a drill string, and, (B) a coiled tubing.

29. The apparatus of claim 25, wherein each transmitter antenna is set in a circumferential recess on the inside of the cylindrical enclosure.

30. The apparatus of claim 29 further comprising a ferrite material positioned in the recess for shielding the cylindrical enclosure from electromagnetic radiation.

31. The apparatus of claim 25, wherein the at least one frequency further comprises at least two frequencies.

32. A method for determining a parameter of interest of a material comprising:
(a) operatively coupling a core bit to a cylindrical enclosure;
(b) conveying the cylindrical enclosure into a borehole in a subterranean formation on a drilling tubular;
(c) operating the core bit for separating the material from the subterranean formation;
(d) enclosing the material in the cylindrical enclosure, wherein the enclosure includes a first transmitter antenna and a second transmitter antenna arranged symmetrically about a first receiver antenna and a second receiver antenna;
(f) inducing electromagnetic radiation in the material by sequentially activating the first and second transmitter antennas at at least one frequency; and
(g) measuring with the first and second receiver antennas the electromagnetic radiation induced in the material by the first and second transmitter antennas, said measurements indicative of the parameter of interest.

33. The method of claim 32 further comprising using a processor for processing the data to determine measures of the parameters of interest.

34. The method of claim 33 the processor location is selected from the group consisting of (i) down hole on a drill string and (ii) on the surface for real time monitoring.

35. The method of claim 32, wherein the drilling tubular is selected from the group consisting of (A) a drill string and (B) a coiled tubing.

36. The method of claim 32, wherein the location of the transmitter antennas and the receiver antennas is selected from the group consisting of (i) a recess in the enclosure and (ii) a plurality of apertures in the enclosure.

37. The method of claim 32, wherein the at least one frequency further comprises at least two frequencies.

* * * * *